(12) United States Patent
Kawashima

(10) Patent No.: US 11,446,599 B2
(45) Date of Patent: Sep. 20, 2022

(54) PARTICULATE FILTER AND MANUFACTURING METHOD FOR SAME

(71) Applicant: ISUZU MOTORS LIMITED, Tokyo (JP)

(72) Inventor: Yukihiro Kawashima, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 17/274,089

(22) PCT Filed: Sep. 5, 2019

(86) PCT No.: PCT/JP2019/034897
§ 371 (c)(1),
(2) Date: Mar. 5, 2021

(87) PCT Pub. No.: WO2020/050344
PCT Pub. Date: Mar. 12, 2020

(65) Prior Publication Data
US 2021/0331111 A1 Oct. 28, 2021

(30) Foreign Application Priority Data
Sep. 7, 2018 (JP) .............................. JP2018-167881

(51) Int. Cl.
*B01D 46/00* (2022.01)
*B01D 46/24* (2006.01)
(Continued)

(52) U.S. Cl.
CPC ....... *B01D 46/247* (2013.01); *B01D 39/2075* (2013.01); *B01D 46/0001* (2013.01);
(Continued)

(58) Field of Classification Search
CPC ............ B01D 46/0001; B01D 46/2455; B01D 2279/30; B01D 46/2478; B01D 46/2484;
(Continued)

(56) References Cited

U.S. PATENT DOCUMENTS 9,073,289 B2 * 7/2015 Tamai ....................... B32B 3/12
9,156,742 B2 * 10/2015 Hayashi ............. B01D 46/2476
(Continued)

FOREIGN PATENT DOCUMENTS

DE 112013000716 T5 11/2014
EP 1486243 A1 12/2004
(Continued)

OTHER PUBLICATIONS

The State Intellectual Property Office of People's Republic of China, The First Office Action, CN 201980058048.9, dated Dec. 23, 2021, in 12 pages.
(Continued)

*Primary Examiner* — Tom P Duong
(74) *Attorney, Agent, or Firm* — Procopio, Cory, Hargreaves & Savitch LLP

(57) ABSTRACT

A particulate filter 23 is configured by being provided with, arranged side by side, a plurality of honeycomb-shaped segments 29, 30, 31 having a plurality of cells 32. The density of cells in the segments 30, 31 disposed in the outer circumference part is set to be lower than the density of cells in the segments 29 disposed in the center part. In addition, the segments 30, 31 disposed in the outer circumference part are configured so that the density of the cells 32 becomes lower as the area of the end face becomes smaller.

3 Claims, 7 Drawing Sheets

(51) Int. Cl.
  *B01D 39/20* (2006.01)
  *F01N 3/022* (2006.01)
  *F01N 3/023* (2006.01)

(52) U.S. Cl.
  CPC ...... *B01D 46/2455* (2013.01); *B01D 2279/30* (2013.01); *F01N 3/022* (2013.01); *F01N 3/023* (2013.01); *F01N 2330/30* (2013.01)

(58) Field of Classification Search
  CPC ...... F01N 3/022; F01N 3/023; F01N 2330/30; F01N 2330/06; F01N 3/2828; F01N 3/021
  USPC ............................. 55/523; 428/116; 422/180
  See application file for complete search history.

(56) References Cited

U.S. PATENT DOCUMENTS

| | | | |
|---|---|---|---|
| 9,403,339 B2* | 8/2016 | Murata | B32B 3/12 |
| 9,533,294 B2* | 1/2017 | Hayashi | C04B 38/0009 |
| 9,782,723 B2* | 10/2017 | Aoki | C04B 38/0009 |
| 9,782,753 B2* | 10/2017 | Aoki | B01J 23/63 |
| 2005/0126140 A1 | 6/2005 | Ito et al. | |
| 2011/0162348 A1* | 7/2011 | Kim | F01N 13/009 60/303 |
| 2012/0017555 A1 | 1/2012 | Iwasaki et al. | |
| 2014/0205794 A1* | 7/2014 | Tamai | B32B 3/12 428/116 |
| 2015/0047307 A1 | 2/2015 | Hayashi et al. | |
| 2015/0275726 A1* | 10/2015 | Tamai | B01D 46/247 428/116 |
| 2017/0266908 A1* | 9/2017 | Kawakami | F01N 3/2828 |
| 2018/0043596 A1* | 2/2018 | Imaizumi | B28B 3/269 |
| 2018/0043597 A1* | 2/2018 | Imaizumi | B28B 3/269 |
| 2018/0104636 A1* | 4/2018 | Miyairi | B01D 46/84 |

FOREIGN PATENT DOCUMENTS

| | | |
|---|---|---|
| JP | 2003-275521 A | 9/2003 |
| JP | 2016-029272 A | 3/2016 |
| JP | 2018-003811 A | 1/2018 |
| WO | 2005102498 A2 | 11/2005 |
| WO | 2010/113585 A1 | 10/2010 |

OTHER PUBLICATIONS

International Search Report and Written Opinion for related PCT App No. PCT/JP2019/034897 dated Nov. 19, 2019, 9 pgs. (partial translation).

Office Action for related DE App No. 112019004492.3 dated May 6, 2021, 10 pgs.

* cited by examiner

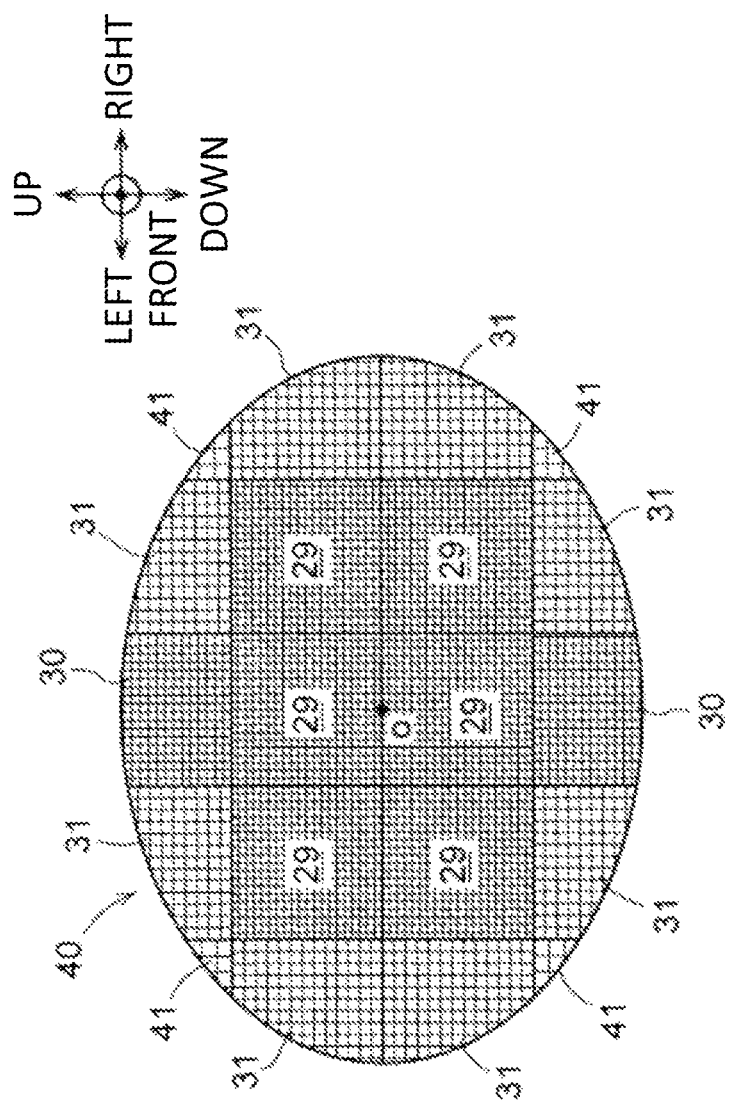

PARTICULATE FILTER AND MANUFACTURING METHOD FOR SAME

CROSS-REFERENCE TO RELATED APPLICATIONS

This application is a U.S. National Stage entry of PCT Application No: PCT/JP2019/034897 filed Sep. 5, 2019, which claims priority to Japanese Patent Application No. 2018-167881 filed Sep. 7, 2018, the contents of which are incorporated herein by reference.

TECHNICAL FIELD

The present disclosure relates to a particulate filter and a manufacturing method for the same.

BACKGROUND ART

A particulate filter collects particulate matter (PM) contained in an exhaust gas.

Therefore, the particulate filter on which the particulate matter is deposited needs filter regeneration by burning off the particulate matter or the like.

CITATION LIST

Patent Document

Patent Literature 1: JP-A-2003-275521
Patent Literature 2: JP-A-2016-029272

SUMMARY OF THE INVENTION

Technical Problem

However, for the particulate filter, there is a concern that unburned residue of particulate matter is produced during filter regeneration. Therefore, the particulate filter may be gradually clogged due to repeated filter regeneration, and the regeneration interval may be shortened, in some cases. In particular, the unburned residue of particulate matter tends to occur on an outer circumference part of the particulate filter.

The present disclosure was devised in view of such circumstances, and an object of the present disclosure is to provide a particulate filter capable of reducing unburned residue of particulate matter during filter regeneration and a manufacturing method for the same.

Solution to Problem

According to one aspect of the present disclosure, it is provided of a particulate filter including a plurality of honeycomb-shaped segments configured to be provided in parallel, the segment including a plurality of cells, in which a density of cells of the segment disposed in an outer circumference part is set to be lower than a density of cells of the segment disposed in a center part, and the segment disposed in the outer circumference part is configured to have the density of the cells thereof which is lower as an end surface of the segment disposed in the outer circumference part has smaller area.

Preferably, the segment disposed in the outer circumference part is configured to have the density of the cells thereof which is lower as the segment disposed in the outer circumference part is disposed farther from a center of the particulate filter.

Preferably, the segments are configured with silicon carbide.

It is provided of a manufacturing method for a particulate filter including a plurality of honeycomb-shaped segments configured to be provided in parallel, the segment including a plurality of cells, the method including the steps of:

measuring an amount of unburned residue of particulate matter in the segment disposed in an outer circumference part for each position thereof in advance;

setting a density of cells of the segment disposed in the outer circumference part to be lower than a density of cells of the segment disposed in a center part;

setting the segment disposed in the outer circumference part to have the density of the cells thereof which is lower as an end surface of the segment disposed in the outer circumference part has smaller area; and setting the density of the cells of the segment disposed in the outer circumference part to be lower as the amount of unburned residue of the particulate matter is greater.

Advantageous Effects of Invention

According to the aspect described above, it is possible to reduce unburned residue of particulate matter during filter regeneration.

BRIEF DESCRIPTION OF THE DRAWINGS

FIG. 7 is a front view of a particulate filter according to another embodiment.

DESCRIPTION OF EMBODIMENTS

Hereinafter, embodiments of the present disclosure will be described with reference to the drawings. In the embodiment described below, for convenience of explanation, the upstream side is also referred to as the front side, and the downstream side is also referred to as the rear side.

First Embodiment

Figure 1:
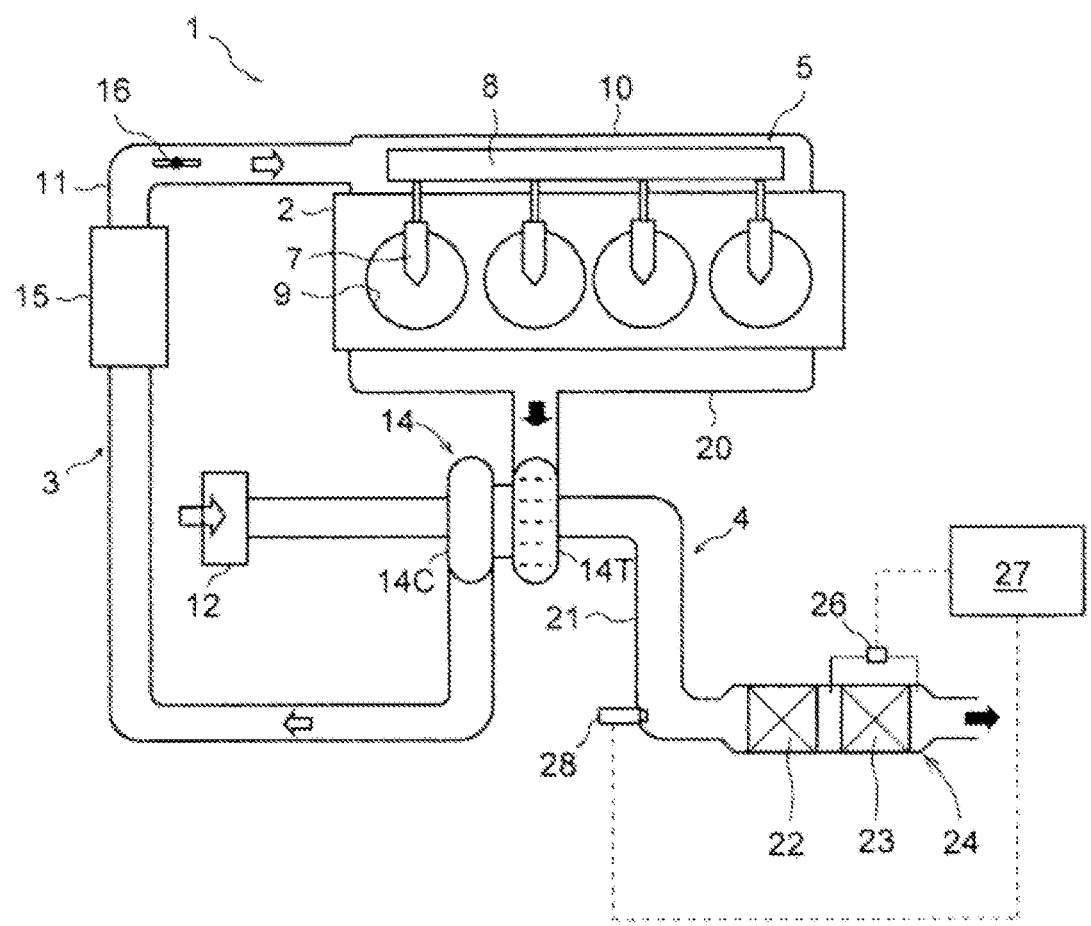
FIG. 1 is a schematic explanatory view of an internal combustion engine according to an embodiment of the present disclosure.

FIG. 1 is a schematic explanatory view of an internal combustion engine (an engine) according to an embodiment. The engine 1 is a multi-cylinder compression ignition type internal combustion engine mounted on a vehicle, that is, a diesel engine. Although the illustrated example shows an in-line 4-cylinder engine, the cylinder disposal type, the number of cylinders, and the like of the engine are optional.

The engine 1 includes an engine main body 2, an intake passage 3 and an exhaust passage 4 connected to the engine main body 2, and a fuel injection device 5. The engine body 2 includes structural parts such as a cylinder head, a cylinder block, a crankcase, and the like, and movable parts such as a piston, a crankshaft, a valve housed therein, and the like.

The fuel injection device 5 includes a common rail type fuel injection device, and includes a fuel injection valve, that is, an injector 7, provided in each cylinder, and a common rail 8 connected to the injector 7. The injector 7 injects fuel directly into the cylinder 9. The common rail 8 stores the fuel injected from the injector 7 in a high pressure state.

The intake passage 3 is mainly defined by an intake manifold 10 (particularly, a cylinder head) connected to the engine body 2 and an intake pipe 11 connected to the upstream end of the intake manifold 10. The intake manifold 10 supplies the intake air sent from the intake pipe 11 to the intake ports of each cylinder in a distribution manner. The intake pipe 11 is provided with an air cleaner 12, a compressor 14C of a turbocharger 14, an intercooler 15, and an electronically controlled intake throttle valve 16 in this order from the upstream side.

The exhaust passage 4 is mainly defined by an exhaust manifold 20 connected to the engine body 2 (particularly, a cylinder head) and an exhaust pipe 21 disposed on the downstream side of the exhaust manifold 20. The exhaust manifold 20 collects the exhaust gas sent from the exhaust port of each cylinder. The turbine 14T of the turbocharger 14 is provided in the exhaust pipe 21 or between the exhaust manifold 20 and the exhaust pipe 21. In the exhaust pipe 21 on the downstream side of the turbine 14T, an oxidation catalyst 22 and a particulate filter 23 (hereinafter, referred to as "DPF") are provided in this order from the upstream side.

Figure 2:
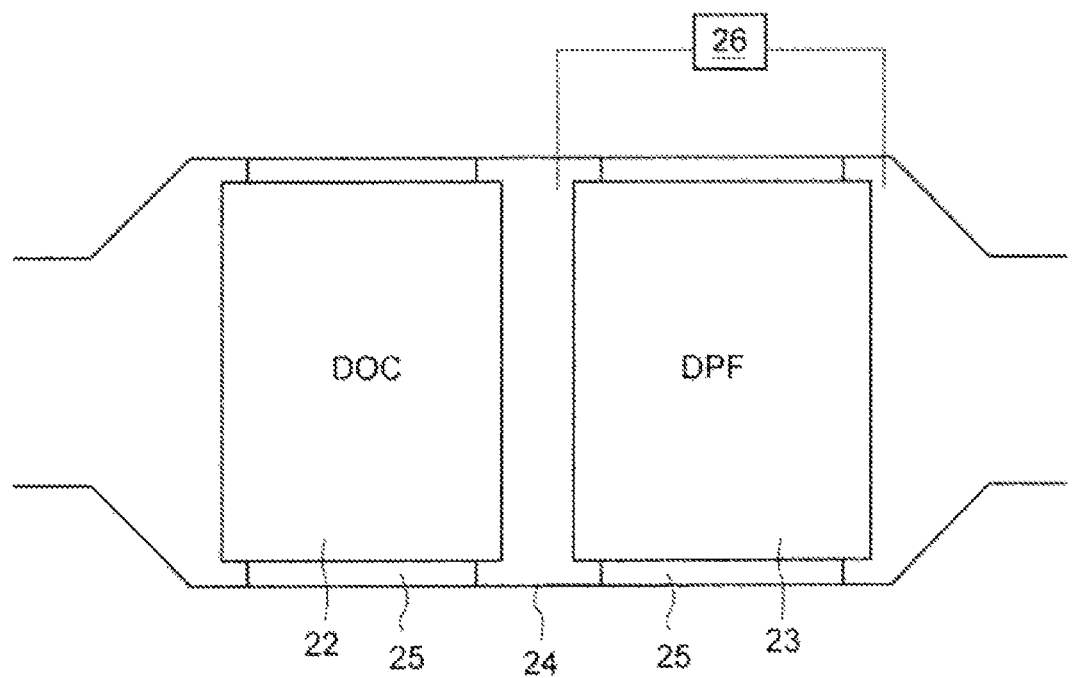
FIG. 2 is an enlarged view of a main part of FIG. 1.

As shown in FIG. 2, the oxidation catalyst 22 and the DPF 23 are formed in a columnar shape with substantially the same diameter. The oxidation catalyst 22 and the DPF 23 are disposed in a canning case 24 coaxially and with a minute gap. Outer peripheral surfaces of the oxidation catalyst 22 and the DPF 23 are held in the canning case 24 by a mat 25. A differential pressure sensor 26 for detecting the differential pressure at the inlet and outlet of the DFP 23 is connected to the canning case 24. The differential pressure sensor 26 is connected to a control device 27. The differential pressure sensor 26 transmits the differential pressure information to the control device 27 as an electric signal. An exhaust pipe injection nozzle 28 is provided in the exhaust pipe 21 on the upstream side of the canning case 24. The exhaust pipe injection nozzle 28 injects fuel containing hydrocarbon (HC) into the exhaust pipe 21 in response to a command from the control device 27.

The oxidation catalyst 22 oxidizes and purifies unburned components (hydrocarbon HC and carbon monoxide CO) in the exhaust gas, heats the exhaust gas and raises the temperature thereof with the heat of reaction here, and also oxidizes NO in the exhaust to $NO_2$.

The DPF 23 collects and removes particulate matter (PM) contained in the exhaust gas. The DPF 23 is a so-called wall flow type. The DPF 23 is configured with silicon carbide.

The DPF 23 includes a so-called continuously regenerating type catalytic DPF carrying noble metal such as Pt or the like on an inner wall thereof. The catalytic action of noble metal oxidizes and burns HC in the exhaust gas supplied to the DPF 23. The PM deposited in the DPF 23 is burned and removed along with the combustion.

The DPF 23 is subjected to filter regeneration (burning of PM to remove it) by filter regeneration controlling. An example of the filter regeneration controlling includes a forced regeneration control in which, when the PM deposit amount in the DPF 23 exceeds a predetermined amount, the deposited PM is forcibly burned to be removed, to restore the PM collection capacity. Whether the PM deposit amount exceeds the predetermined amount is determined based on the differential pressure information transmitted from the differential pressure sensor 26 to the control device 27. The burning and removal of the PM deposit is performed by injecting fuel into the exhaust pipe 21 from the exhaust pipe injection nozzle 28. This injection enriches the exhaust air-fuel ratio. Then, the HC in the exhaust gas reacts with the catalyst in the DPF 23, and the heat of reaction here may oxidize and burn the PM deposit. That is, when the differential pressure transmitted from the differential pressure sensor 26 exceeds a predetermined value, the control device 27 causes the exhaust pipe injection nozzle 28 to inject fuel for filter regeneration (forced regeneration) of the DPF 23. In some filter regeneration controlling, even when the PM deposit amount does not exceed the predetermined value, the PM deposit is burned and removed when the mileage of the vehicle since the end of the previous filter regeneration controlling exceeds the predetermined value. Note that the filter regeneration controlling is not limited thereto. For example, the filter regeneration controlling may perform post-injection (in-cylinder injection performed in the expansion stroke after the main injection) from the injector 7 instead of fuel injection from the exhaust pipe injection nozzle 28. In addition to the filter regeneration controlling (automatic regeneration) described above, an example of the filter regeneration also includes a manual regeneration executed by a manual operation by the driver or the like regardless of the differential pressure between the inlet and the outlet of the DFP 23 and the mileage of the vehicle.

Figure 3:
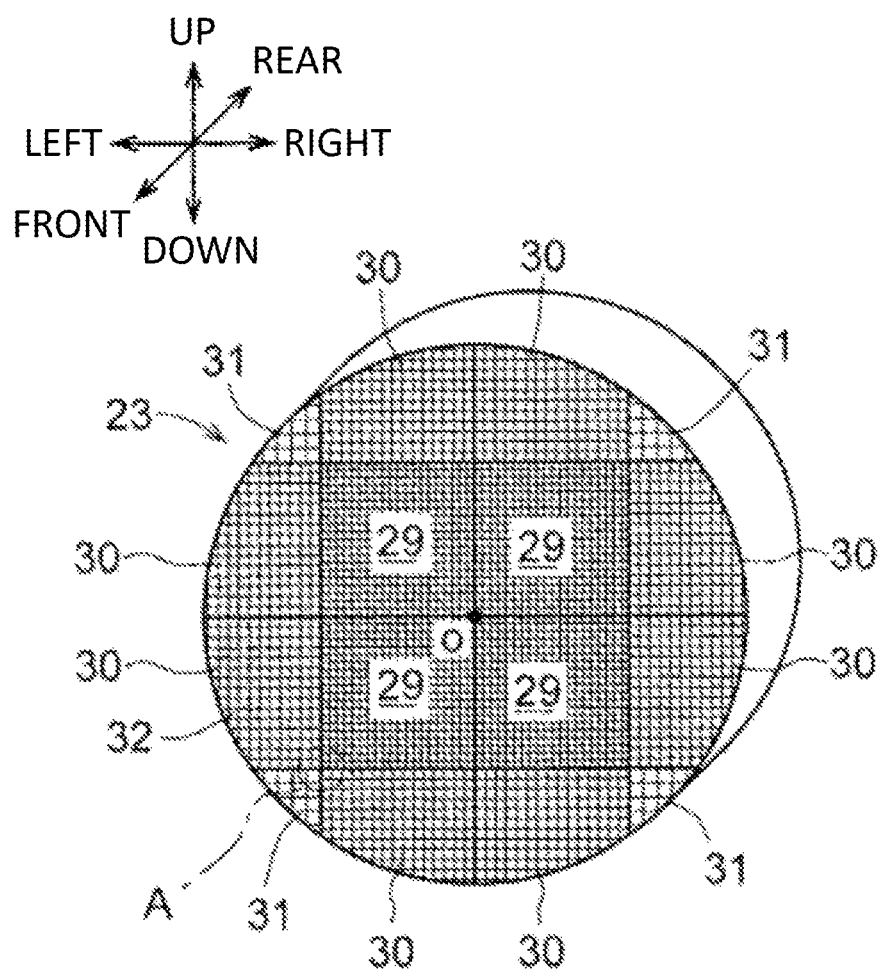
FIG. 3 is a perspective view of a particulate filter.
Figure 4:
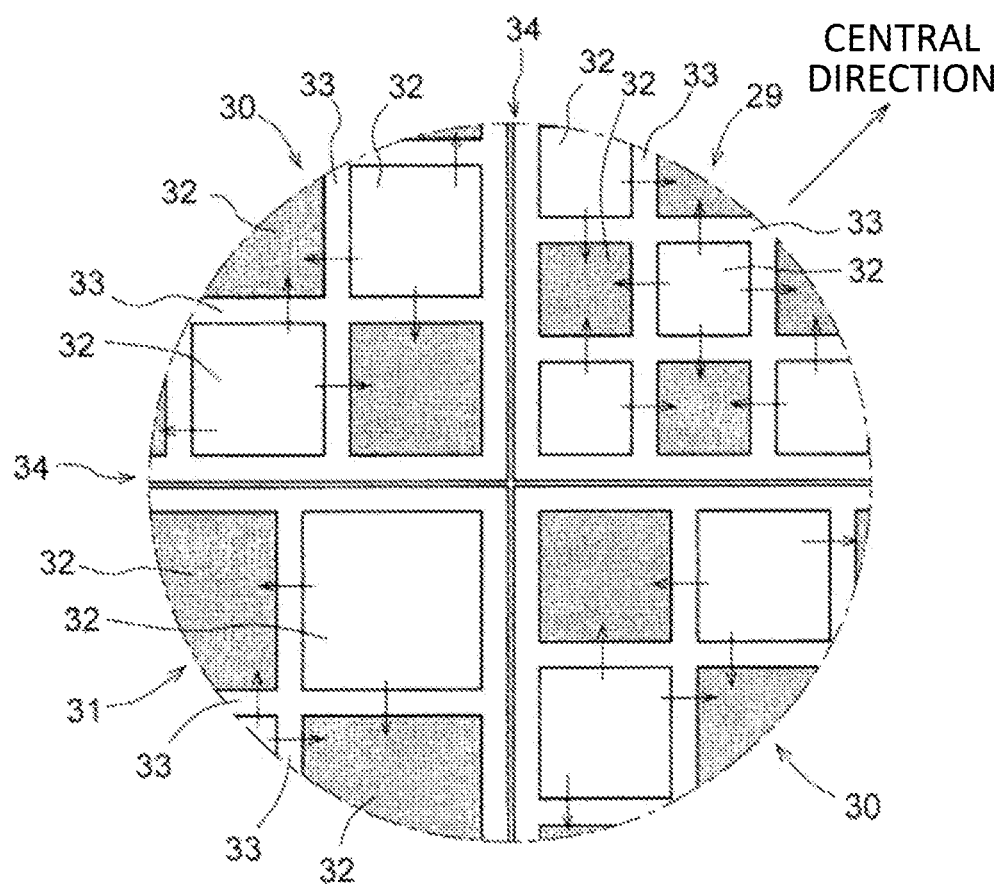
FIG. 4 is an enlarged view of part A of FIG. 3.

FIG. 3 is a perspective view showing the DPF 23 when viewed from the upstream side in the exhaust gas flow. FIG. 4 is an enlarged view of part A in FIG. 3. The shading in FIG. 4 represents the sealing of the cell 32. For convenience of explanation, it is assumed that the upstream side of the DPF 23 is the front side, and the downstream side is the rear side.

As shown in FIG. 3, the DPF 23 is configured of a plurality of segments 29, 30, 31 provided adjacent to each other and in parallel. The segments 29, 30, 31 are formed in a honeycomb shape including a plurality of cells 32, and are formed by alternately closing the openings at both ends of the cell 32 in a checkered pattern. The DPF 23 is prepared by fabricating a plurality of segments 29, 30, 31 having a rectangular cross section, bonding the plurality of the segments 29, 30, 31 in parallel, and cutting the outer surface thereof to match the shape of the canning case 24. The calming case 24 and the DPF 23 are formed to have a circular cross section. An adhesive includes silicon carbide, for example. The surface on which the segments 29, 30, 31 are bonded on each other hardly allows the exhaust gas to pass through, and does not have a function of collecting PM in the exhaust gas.

The DPF 23 is configured of a combination of a plurality of types of segments 29, 30, 31 having different densities of the cells 32 (hereinafter, referred to as "cell densities"). Among the plurality of types of segments 29, 30, 31, the segment 29 having the highest cell density is disposed in the center part of the DPF 23. The segments 30, 31 having a lower cell density than those of the center part are disposed in the outer circumference part of the DPF 23.

The segments 30, 31 disposed in the outer circumference part of the DPF 23 are configured to have the cell density which is lower as an end surface thereof has smaller area. As a result, the amount of gas flowing through the segments 30, 31 can be increased at a position where the PM is likely to remain unburned during filter regeneration. Then, it is possible to prevent a decrease in temperature of the segments 30, 31 in the outer circumference part due to heat transfer to the canning case 24.

In the present embodiment, the DPF 23 is configured of a combination of three types (a plurality of types) of segments 29, 30, 31. As shown in FIGS. 3 and 4, the DPF 23 includes the high density segment 29, the medium density segment 30 having the cell density lower than that of the high density segment 29, and the low density segment 31 having the cell density lower than that of the medium density segment 30. The high density segment 29 is set to have a cell density similar to that of the DPF of the same type in the related art. The cell densities of the medium density segment 30 and the low density segment 31 are determined by experiments, simulations, and the like such that the regeneration performance (performance of regenerating without leaving unburned residue) during filter regeneration, PM collection performance, resistance to temperature changes, and the like are optimized.

The center part of the DPF 23 is configured of a set of two high density segments 29 in horizontal and vertical directions, respectively. Among the outer circumference parts of the DPF 23, the outer circumference parts at positions where the area of the end surface is relatively larger, that is, at positions adjacent to each of the upper, lower, left, and right surfaces of the pairs of high density segments 29 are configured of the medium density segments 30. The outer circumference parts at positions where the area of the end surface is relatively smaller, that is, at positions adjacent to the pairs of the high density segments 29 in the diagonal direction are configured of the low density segments 31.

Next, the operation of the present embodiment will be described.

When the engine 1 is operated, the exhaust gas from the engine body 2 flows into the exhaust pipe 21. After that, the exhaust gas flows into the DPF 23 via the oxidation catalyst 22. The exhaust gas flowing into the DPF 23 flows into the cell 32 whose front end is open, passes through fine pores (not shown) formed in partition walls 33 between the cells 32 and flows into the adjacent cell 32. Here, PM does not pass through the pores. Therefore, the PM is collected in the partition walls 33 between the cells 32. Here, the partition walls 34 formed by adhering the partition walls 33 of the segments 29, 30, 31 to each other is not air-permeable.

The control device 27 acquires the differential pressure information from the differential pressure sensor 26 at a predetermined cycle, and determines whether the differential pressure exceeds the predetermined value. Then, when the differential pressure exceeds a predetermined value, the control device 27 injects fuel from the exhaust pipe injection nozzle 28 for filter regeneration (forced regeneration) of the DPF 23.

Meanwhile, in a DPF of the related art (not shown in the drawings), a larger amount of exhaust gas flows in the center part, and a smaller amount of exhaust gas flows in the outer circumference part. The outer circumference part of the DPF is close to the calming case 24. Therefore, the outer circumference part of the DPF is likely to be cooled by a heat transfer to the canning case 24. Therefore, in the DPF of the related art, the temperature of the outer circumference part is likely to be lower than that of the center part during filter regeneration, and unburned residue of PM is likely to occur in the outer circumference part.

Figure 5:
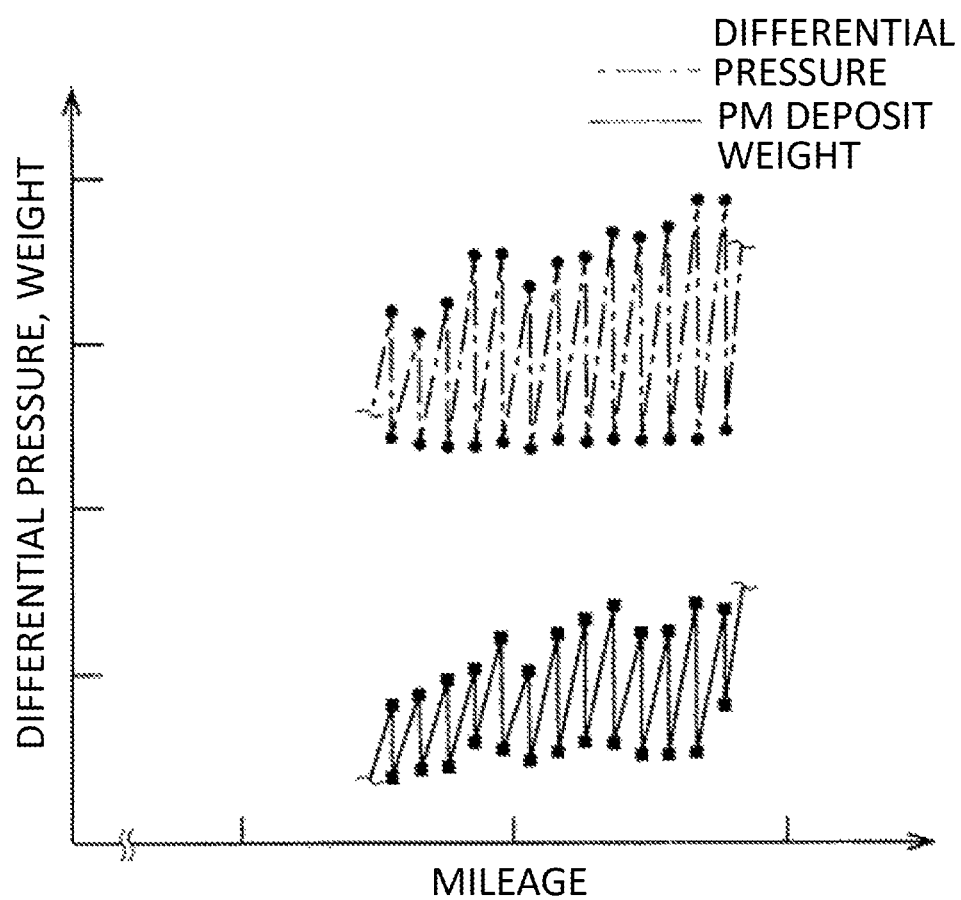
FIG. 5 is a view showing a state in which regeneration interval is shortened.

FIG. 5 is a graph showing a relationship between the mileage and a PM deposit weight and differential pressure in the DPF of the related art. The solid line shows the PM deposit weight, and the alternate long and short dash line shows the differential pressure detected by the differential pressure sensor 26. The vertical axis represents the PM deposit weight and the differential pressure, and the horizontal axis represents the mileage. As shown in the drawing, each time the differential pressure exceeds the predetermined value, the differential pressure and the PM deposit weight are decreased sharply. This is due to the filter regeneration controlling. That is, it is a result of performing fuel injection and filter regeneration (forced regeneration) of the DPF every time the differential pressure exceeds the predetermined value. The initial value of the PM deposit weight immediately after regeneration tends to increase as the filter regeneration repeats. That is, the PM left unburned during the filter regeneration is accumulated cumulatively.

Therefore, in the DPF 23 according to the present embodiment, the cell density of the segments 30, 31 disposed in the outer circumference part is set to be lower than that of the segment 29 disposed in the center part. Accordingly, the flow rate of the exhaust gas at the outer circumference part of the DPF 23 can be made greater than that of the DPF of the related art. Then, the decrease in temperature of the segments 30, 31 disposed in the outer circumference part of the DPF 23 can be prevented. Therefore, it is possible to eliminate or reduce the unburned residue of PM in the outer circumference part which is otherwise generated in the filter regeneration of the DPF of the related art.

The DPF of the related art has a position of the outer circumference part where unburned residue of PM is very likely to occur and a position of the outer circumference part where the unburned residue of PM is less likely to occur.

Figure 6:
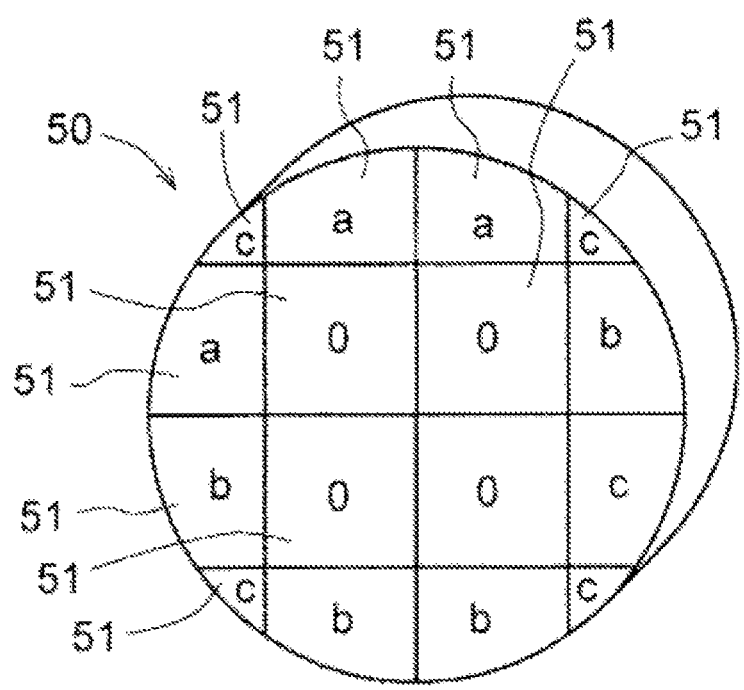
FIG. 6 is an explanatory view of a front surface of a particulate filter, showing an amount of unburned residue of particulate matter.

FIG. 6 is an explanatory view showing an example of the amount of unburned residue during filter regeneration in the DPF 50 in which the cell density is uniformly formed. The DPF 50 is prepared for experiment and is formed by imitating the DPF 23 according to the present embodiment. In the drawing, a, b, and c indicate the amounts of unburned residue (g/L). The relationship between a, b and c is a<b<c. As shown in the drawing, the segment 51 having a smaller end surface area tends to cause more PM to remain unburned.

Therefore, in the present embodiment, the segments 30, 31 disposed in the outer circumference part are configured to have the cell density which is lower as the end surface thereof has smaller area. That is, the outer circumference part at the position where a cross-sectional area of the end surface is small and a large amount of PM is likely to remain unburned is configured of the low density segments 31. As a result, the unburned residue of PM is prevented or reduced. On the other hand, the outer circumference part at the position where the cross-sectional area of the end surface is large and the unburned residue of PM is relatively small is configured of the medium density segment 30. As a result, the lowering of the cell density more than necessary is prevented or reduced, and the deterioration of PM collection performance is prevented or reduced. Then, the balance between the PM collection performance and the regeneration performance can be optimized.

Depending on conditions such as the position where the canning case 24 is disposed, and the like, there may be a difference in the amount of unburned residue of PM even though the area of the end surface is the same. In such a case, the types of segments 30, 31 may be appropriately varied according to the amount of unburned residue of PM. As a specific method, first, the amount of unburned residue of PM in the segments located in the outer circumference parts is measured in advance for each position. Next, the cell density of the segments 30, 31 located in the outer circumference part is set to be lower than the cell density of the segments 29 located in the center part. Then, the segments 30, 31 disposed in the outer circumference part are configured to have the cell density which is lower as the end surface thereof has smaller area. The segments 30, 31 disposed in the outer circumference part may be configured to have the cell density which is lower as the amount of unburned residue of PM is greater.

When the DPF of the related art is housed in the same canning case 24 as the oxidation catalyst 22, also in the oxidation catalyst 22, the flow rate of the outer circumference part is smaller than that of the central side, and the PM is likely to be clogged in the outer circumference part of the oxidation catalyst 22. However, the flow rate of the outer circumference part of the DPF 23 according to the present embodiment is greater than that of the DPF of the related art. Therefore, the DPF 23 according to the present embodiment can allow a good flow of the exhaust gas to the outer circumference part of the oxidation catalyst 22 even in the state of being housed in the same canning case 24 as the oxidation catalyst 22. Then, the clogging of PM in the outer circumference part of the oxidation catalyst 22 can be improved.

Second Embodiment

Although the DPF 23 is illustrated as being formed with a circular cross section, it is not limited thereto. For example, as shown in FIG. 7, the DPF 40 may be formed with an elliptical cross section. Segments 30, 31, 41 may be disposed in the outer circumference part of the DPF 40 to have the cell density which is lower as the segment is disposed farther from the center O of the DPF 40.

Specifically, in the present embodiment, the DPF 40 is configured of a combination of four types of segments 29, 30, 31, 41. The DPF 40 is configured of a combination of the high density segment 29, the medium density segment 30, the low density segment 31, and an ultra low density segment 41. The ultra low density segment 41 is set to have a lower cell density than the low density segment 31.

The high density segment 29 is located in the center part of the DPF 40. The center part described above is a position where the entire outer peripheral surface is surrounded by the other segments 30, 31, 41. Specifically, a total of six high density segments 29 are disposed at the positions facing the center O of the DPF 40 and at the position adjacent to the positions in a long radial direction (horizontal direction). Here, the long radial direction is a direction based on an ellipse, which is the end surface shape of the DPF.

The medium density segments 30 are disposed at the positions closest to the center O of the DPF 40 among the positions of the outer circumference part. Specifically, among the six high density segments 29 forming the center part, the medium density segments 30 are disposed at the positions adjacent to the upper and the lower surfaces of the upper and lower high density segments 29 located in the center in the left and right directions.

Among the positions of the outer circumference part, the low density segments 31 are disposed at the positions where the distance from the center O of the DPF 40 is medium. The positions where the distance from the center O is medium is the position where the distance from the center O of the DPF 40 is neither maximum nor minimum. Specifically, the low density segments 31 are disposed at the positions adjacent to each of the left and right surfaces of the medium density segment 30. The low density segments 31 are also disposed at the positions adjacent to each of the left and right surfaces of the set of high density segments 29.

The ultra low density segments 41 are disposed at the positions farthest away from the center O of the DPF 40 among the positions of the outer circumference part. Specifically, the ultra low density segments 41 are disposed at positions diagonally adjacent to the set of the high density segments 29.

Next, the operation of the present embodiment will be described.

According to the present embodiment, the segments 30, 31, 41 are disposed to have the cell density which is lower as the segment is disposed farther from the center O of the DPF 40. For example, the outermost circumference part that is farthest away from the center O of the DPF 40 and where a large amount of PM is likely to remain unburned is configured of the ultra low density segments 41. As a result, the unburned residue of PM is prevented or reduced. On the other hand, the outer circumference part, which is closer to the center O of the DPF 40 than the ultra low density segments 41 and includes less unburned residue of PM than the ultra low density segments 41, is configured of the medium density segments 30 and the low density segments 31. As a result, the lowering of the cell density more than necessary is prevented or reduced, and the deterioration of PM collection performance is prevented or reduced. Then, the balance between the PM collection performance and the regeneration performance can be optimized.

Note that the configurations of the embodiments described above can be partially or wholly combined unless there is a particular contradiction. The embodiment of the present disclosure are not limited to the embodiment described above, and all modifications, applications, and equivalents included in the ideas of the present disclosure defined by the scope of claims are included in the present disclosure. Therefore, the present disclosure should not be construed in a limited manner and can be applied to any other technique belonging within the scope of the ideas of the present disclosure.

This application is based on Japanese Patent Application (Patent Application No. 2018-167881) filed on Sep. 7, 2018, the contents of which are incorporated herein by reference.

INDUSTRIAL APPLICABILITY

According to the present disclosure, it is useful in view of the fact that a particulate filter capable of reducing unburned residue of particulate matter during filter regeneration and a method for producing the same is provided.

LIST OF REFERENCE NUMERALS 1 engine
2 engine body
3 intake passage
4 exhaust passage
5 fuel injection device
7 injector
8 common rail
9 cylinder
10 intake manifold
11 intake pipe
12 air cleaner
14 turbocharger
14C compressor
14T turbine
15 intercooler 16 intake throttle valve
20 exhaust manifold
21 exhaust pipe
22 oxidation catalyst
23 DPF (particulate filter)
24 canning case
25 mat
26 differential pressure sensor
27 control device
28 exhaust pipe injection nozzle
29 high density segment (segment)
30 medium density segment (segment)
31 low density segment (segment)
32 cell
33 partition wall
34 partition wall
40 DPF
41 ultra low density segment (segment)
O center

The invention claimed is:

1. A particulate filter comprising a plurality of honeycomb-shaped segments configured to be provided in parallel, the segment including a plurality of cells, wherein a density of cells of the segment disposed in an outer circumference part is set to be lower than a density of cells of the segment disposed in a center part, and the segment disposed in the outer circumference part is configured to have the density of the cells thereof which is lower as an end surface of the segment disposed in the outer circumference part has smaller area relative to areas of remaining segments disposed in the outer circumference part.

2. The particulate filter according to claim 1,
wherein the segment disposed in the outer circumference part is configured to have the density of the cells thereof which is lower as the segment disposed in the outer circumference part is disposed farther from a center of the particulate filter.

3. The particulate filter according to claim 1,
wherein the segments are configured with silicon carbide.

* * * * *